(12) United States Patent
Batt (10) Patent No.: US 8,126,198 B2
(45) Date of Patent: Feb. 28, 2012

(54) METHOD FOR AUDITING AND MAINTAINING AN ORDERED INVENTORY

(76) Inventor: Peter Batt, Woodford, VA (US)

(*) Notice: Subject to any disclaimer, the term of this patent is extended or adjusted under 35 U.S.C. 154(b) by 757 days.

(21) Appl. No.: 12/315,243

(22) Filed: Dec. 1, 2008

(65) Prior Publication Data

US 2010/0135522 A1    Jun. 3, 2010

(51) Int. Cl.
*G06K 9/00* (2006.01)
*G08B 13/14* (2006.01)

(52) U.S. Cl. ............... 382/100; 382/224; 340/572.1

(58) Field of Classification Search .......... 382/100, 382/101–103, 106–108, 112–114, 135–140, 382/155, 168, 173, 180, 181–204, 209, 224, 382/232, 254, 274, 276, 286–292, 305, 312, 382/321; 340/572.1; 235/375; 358/1.13; 705/28, 23

See application file for complete search history.

(56) References Cited

U.S. PATENT DOCUMENTS

| | | | | |
|---|---|---|---|---|
| 3,651,478 A | * | 3/1972 | Shandlay | 705/28 |
| 4,141,078 A | * | 2/1979 | Bridges et al. | 235/375 |
| 5,963,134 A | * | 10/1999 | Bowers et al. | 340/572.1 |
| 6,195,006 B1 | * | 2/2001 | Bowers et al. | 340/572.1 |
| 6,418,441 B1 | * | 7/2002 | Call | 705/23 |
| 7,233,246 B2 | * | 6/2007 | Nichols, Sr. | 340/572.1 |
| 7,667,863 B1 | * | 2/2010 | Eldred et al. | 358/1.13 |

* cited by examiner

*Primary Examiner* — Seyed Azarian (57) ABSTRACT

An image based optical character recognition method for auditing, maintaining and storing articles according to an ordered classification scheme not requiring exact physical positions.

9 Claims, 7 Drawing Sheets

METHOD FOR AUDITING AND MAINTAINING AN ORDERED INVENTORY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to inventory systems for libraries or cataloging operation and control. More specifically to an improved inventory method that uses image processing and inventory data and cataloging applications for new inventory control strategies for article placement and position. By more precisely knowing the current ordered location of the articles in inventory and the proper ordered location of the articles but not necessarily exact physical position sorting algorithms are used to minimize the number of articles to be moved to maintain article order.

It is known in the field of Library Circulation Control System U.S. Pat. No. 4,141,078 inventory operation and control to be provided with a means of inventory control by implementation of a barcode placed on the article usually on the front cover or other location but not usually on the spine. Libraries correlate the bar code to the call number and title of the book. This requires staff to maintain both the call number on the spine and the bar code on the cover. With an optical character recognition, OCR, means that reads the call number, the bar code requirement becomes redundant. An exception to the redundancy is the possibility that multiple copies may be on hand. An extension to the Classification System in use could easily accommodate multiple copies.

Within the current art of tracking and inventory control is the use of smart chips such as RFIDs, radio frequency identification device. The RFID would transmit its id when queried by a suitable device indicating its presence but not its order or position within a closely grouped collection such as described within U.S. Pat. No. 5,963,134 inventory with RFID and US Patent Application 0040111335 RFID space monitoring and asset inventory system. Redundancy is required to maintain the inventory label and the RFID tag. The library patron would not have the RFID reader in hand and continues to use the article label to rapidly locate the article.

Recently, patent application 080143584, Method and system for determining the distance between an RFID reader and an RFID tag using phase, and 080186174, Item level inventory with a radio frequency identification (RFID) system, use multiple transmitters and receivers to refine position information of items using RFID. Again redundancy is required and the patron is required to have a reader to rapidly locate the article.

A substantial saving to the library exists lowering order based inventory audit costs by increasing speed of audits without substantial resources expended on RFID systems. A substantial benefit to the library patron exists since the library articles will more frequently be in the proper location without the significant added costs of the numerous RFID communication equipment which could be used to obtain additional library articles.

Further article dimensions may be gathered as to attributes such as width and height to calculate the optimum placement to optimize the use of available shelving space that exist at any moment in time.

Such RFID inventory control systems as previously described possess significant added cost that detract from their overall utility within organizations that consume financial resources; a library typically does not charge for article loans. Thus there is a need for improved capability as to accurate placement method that overcome the aforementioned audit and maintenance disadvantages.

A further significant advantage is due to the lower cost of construction and maintenance by reducing the component count.

Various inventory control system configurations, and methods are referenced within and the entire teachings of which and their references sited therein are expressly incorporated by reference herein.

BRIEF SUMMARY OF THE INVENTION

An object of the invention is to reduce labor and fatigue associated with auditing and maintaining ordered inventories. The present invention represents a an improved method for inventory verification and placement for articles maintained in an ordered system using labeling normally visible and avoiding the necessity to move an article to observe a bar code. The method overcomes fatigue generated by the tedious attention required to maintain order. The method provides guidance for minimizing the number articles to be moved to maintain the ordered inventory and as an aid to placing articles. A simple RFID system is limited by separation distance of the articles possessing an RFID tag. A complex RFID system capable of overcoming separation distances has added complexity and associated increased costs.

DETAILED DESCRIPTION OF THE INVENTION

The following paragraphs describe the method in use for a shelf of articles.

FIGS. 1, 2 and 3A to 3R describe the method with a brief sequence of articles using a general layout of several articles on a shelf as would be seen in a library. The articles are labeled using a fictitious sequence generally in accordance with the U.S. Library of Congress classification scheme; the call number. The sequence order in general is determined by the organizational requirements.

Figure 1:
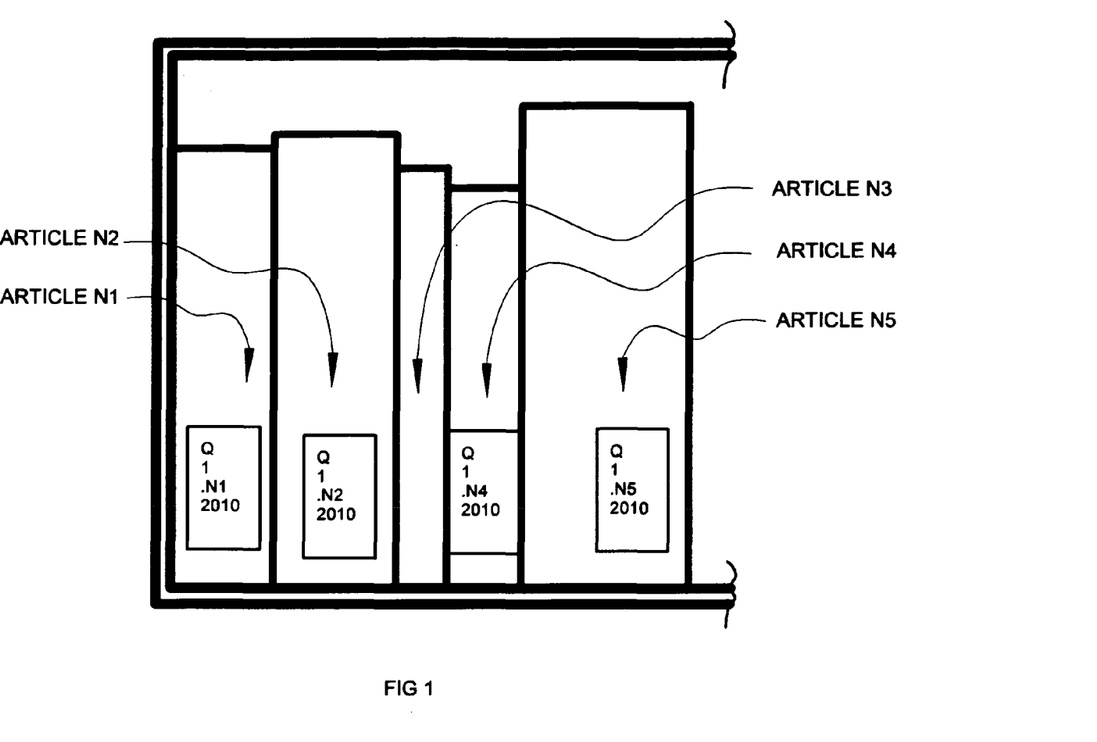
FIG. 1 shows a sketch of several articles on a shelf as would be seen in a library.

FIG. 1 shows the fictitious sequence comprising of 5 articles which may be identified for this discussion as N1 for Q1.N1 2010, N2 for Q1.N2 2010, N3 for Q1.N3 2010, N4 for Q1.N4 2010 and N5 for Q1.N5 2010 where N1 is leftmost, N5 is rightmost and N3 is a thin book with the label not on the spine.

Figure 2:
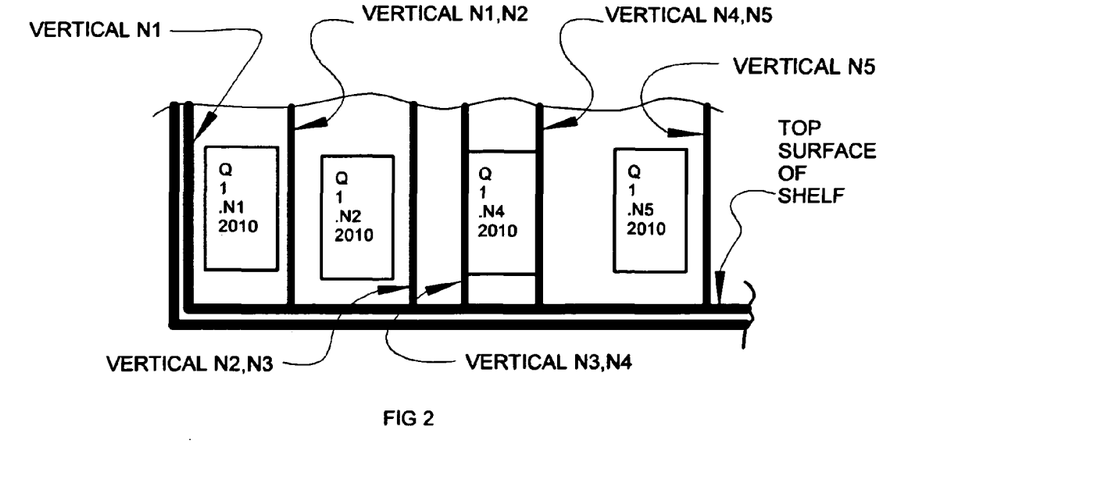
FIG. 2 shows a portion of the several articles of FIG. 1.

FIG. 2 shows a portion of the fictitious sequence described in FIG. 1 with significant edges labeled. The left article edge of N1 is also the shelf vertical left side inside edge. The right article edge of N1 is in common with the left article edge N2; vertical N1,N2. The right article edge of N2 is in common with the left article edge N3; vertical N2,N3. The right article edge of N3 is in common with the left article edge N4; vertical N3,N4. The right article edge of N4 is in common with the left article edge N5; vertical N4,N5. In general the left and right edges may not be common due to gaps, leaning books, etc. The right article edge of N5 is last; vertical N5. The top surface of shelf is also the bottom edge of the articles N1 to N5.

Figure 3A:
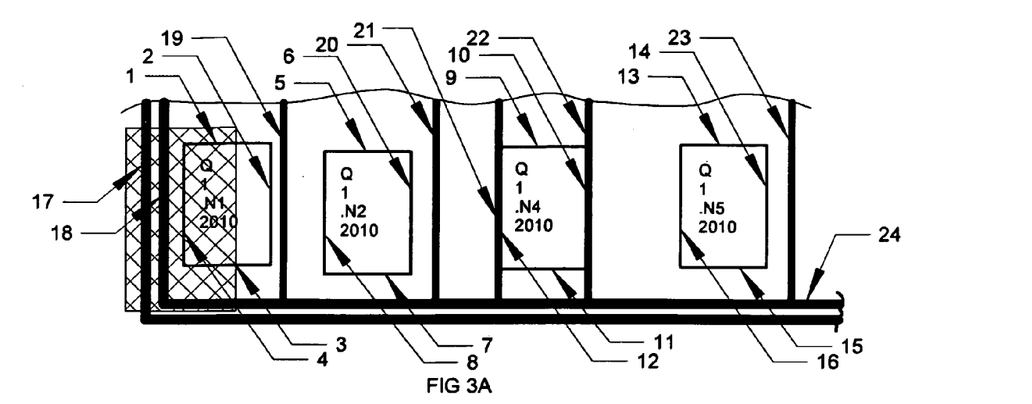
FIGS. 3A to 3R shows an image area passing over the articles of FIG. 1.
Figure 3B:
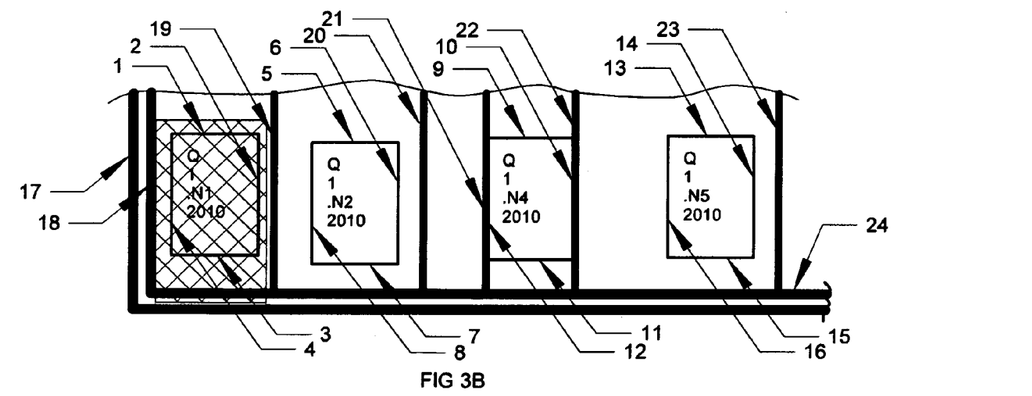
Figure 3C:
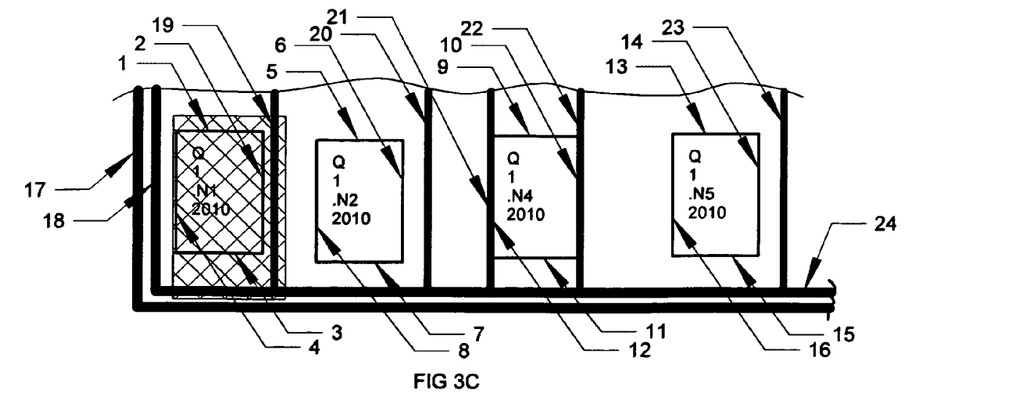
Figure 3D:
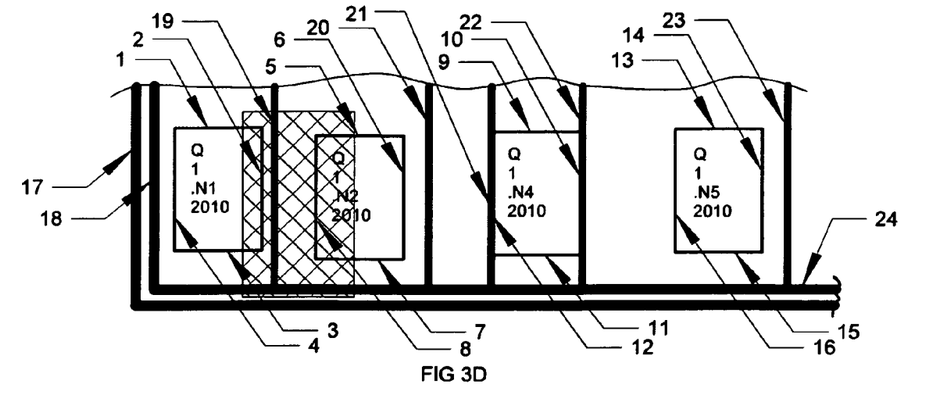
Figure 3E:
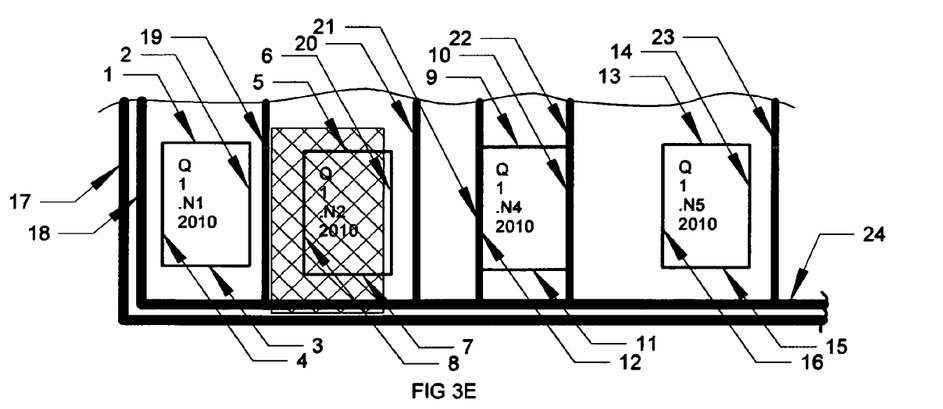
Figure 3F:
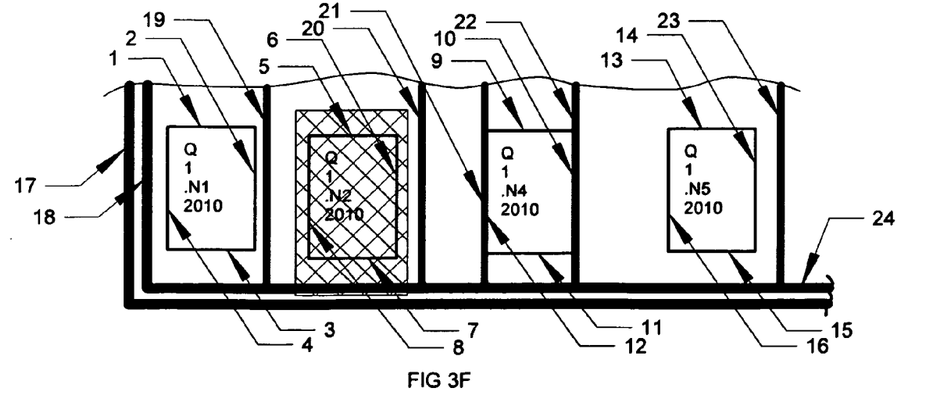
Figure 3G:
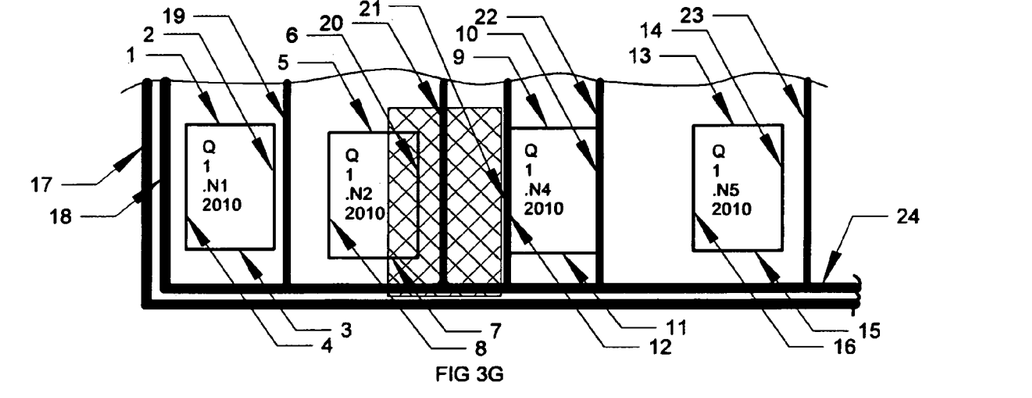
Figure 3H:
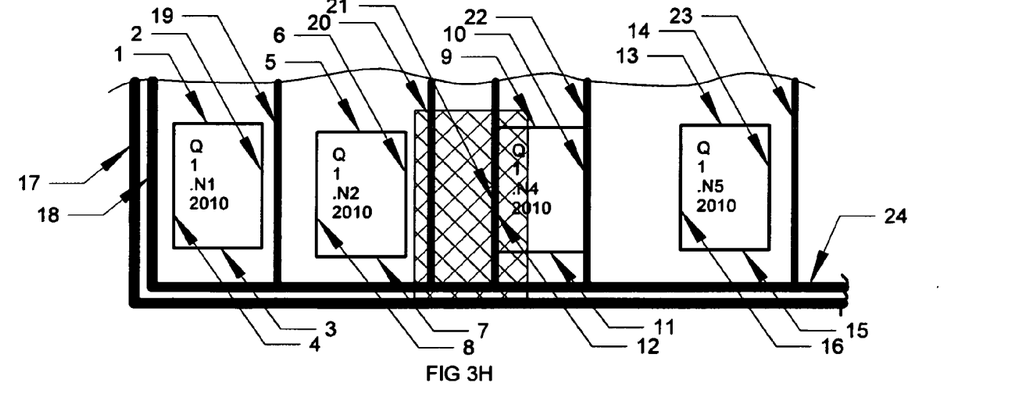
Figure 3I:
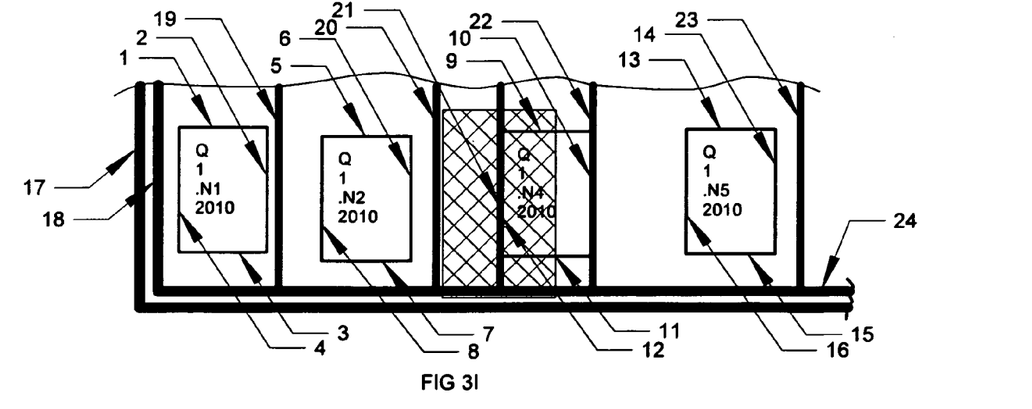
Figure 3J:
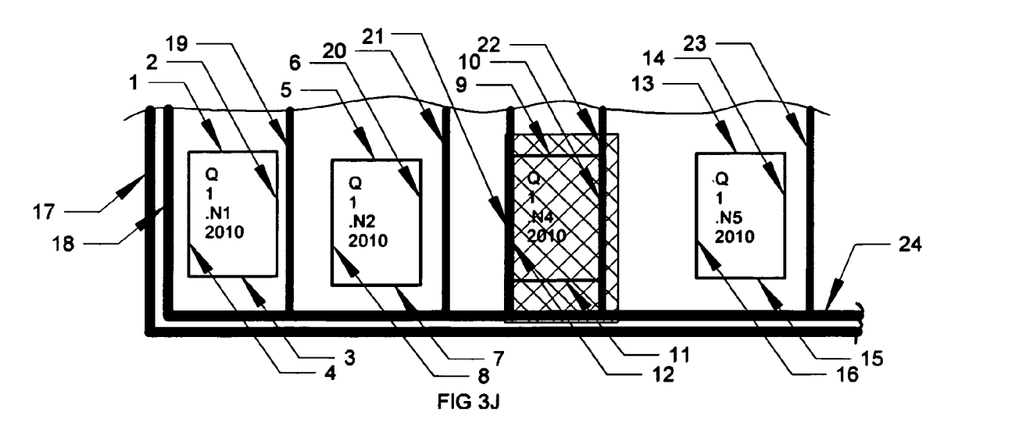
Figure 3K:
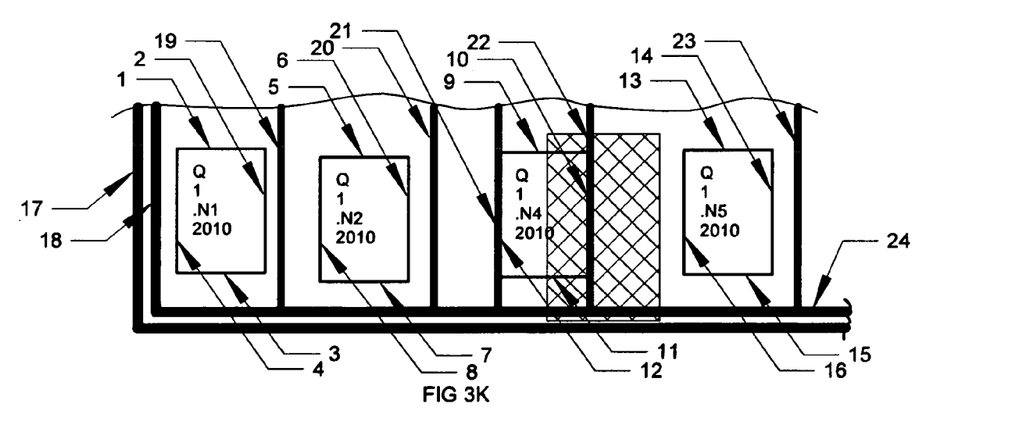
Figure 3L:
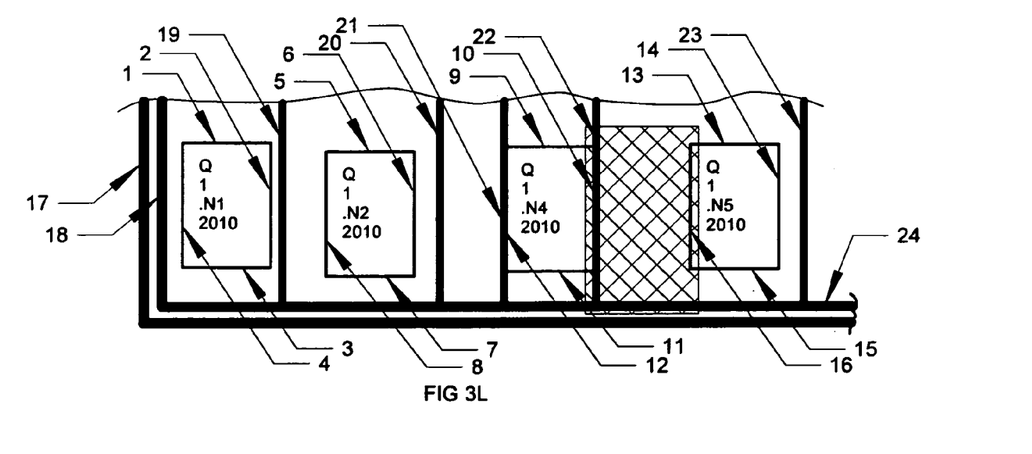
Figure 3M:
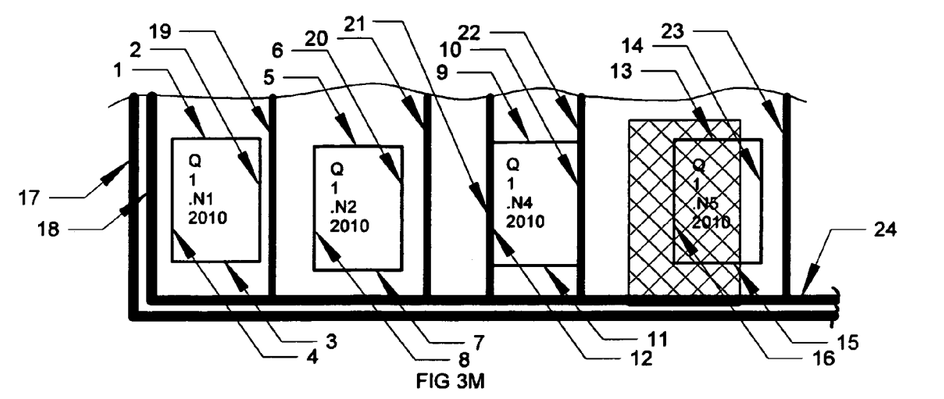
Figure 3N:
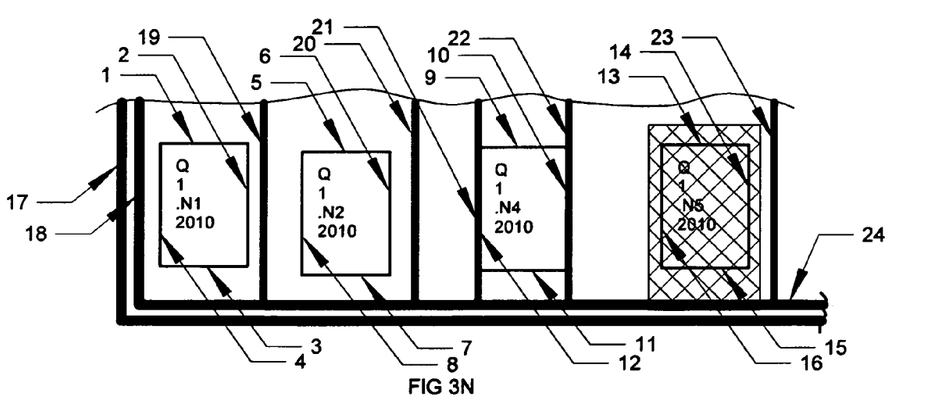
Figure 3O:
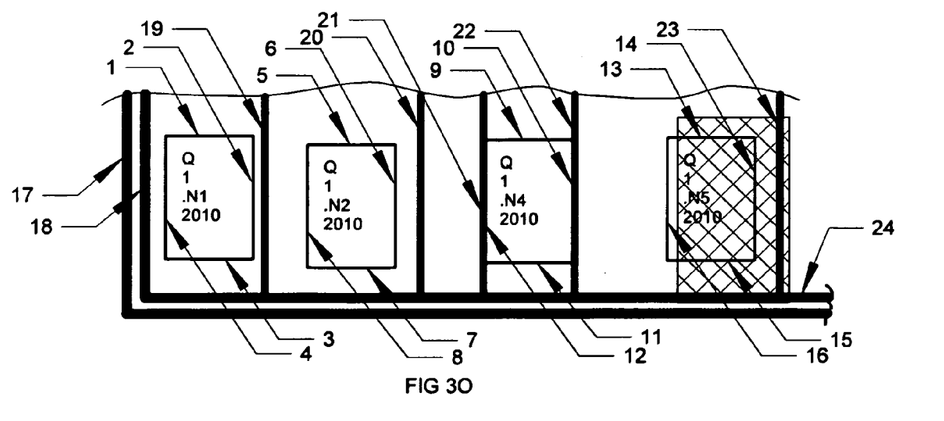
Figure 3P:
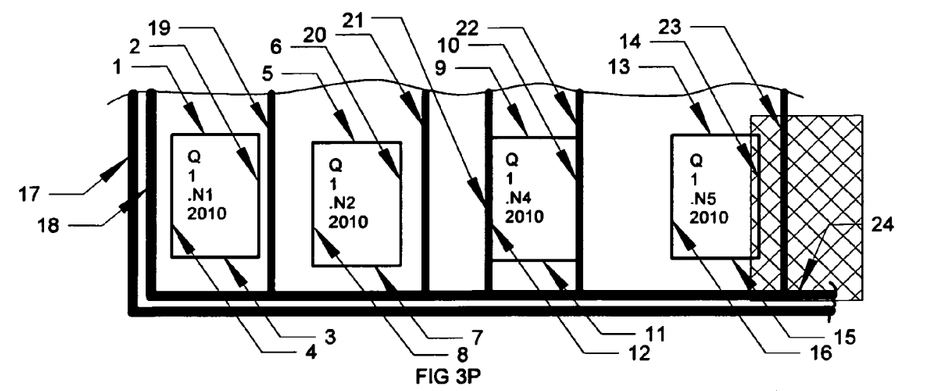
Figure 3Q:
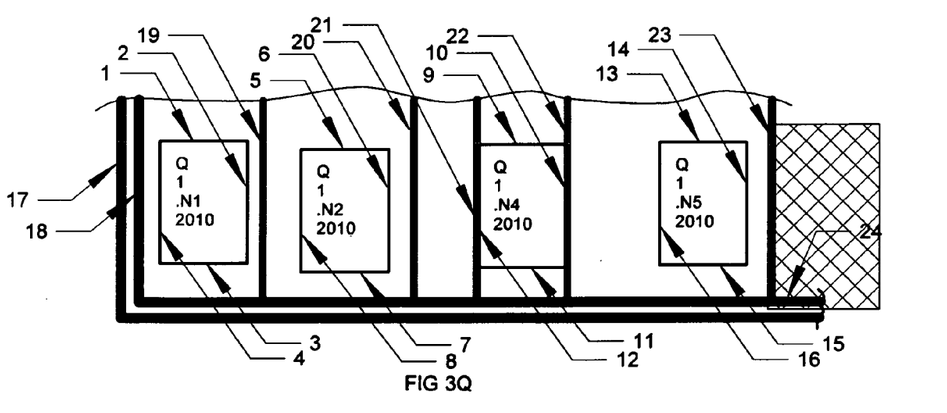
Figure 3R:
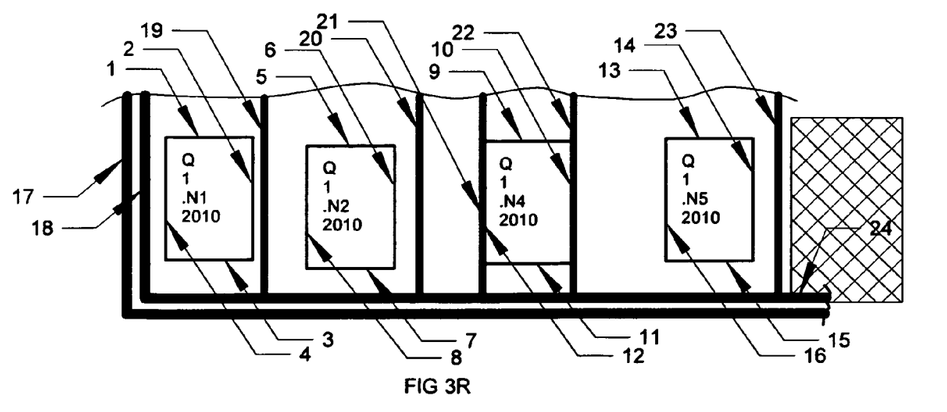

FIGS. 3A to 3R have significant edges labeled. Shelf edges are marked by 17, 18 and 24; where 24 is also an article's bottom edge. Article N1 edges are marked by 18, 19 and 24 with the call number label marked by 1, 2, 3 and 4. Article N2 edges are marked by 19, 20 and 24 with the call number label marked by 5, 6, 7 and 8. Article N3 edges are marked by 20, 21 and 24 with the call number label not on the article's spine. Article N4 edges are marked by 21, 22 and 24 with the call number label marked by 9, 10, 11 and 12 where 12 is the call number label edge that lays along the article spine edge. Article N5 edges are marked by 22, 23 and 24 with the call number label marked by 13, 14, 15 and 16.

FIGS. 3A to 3R show a rectangular area moved from left to right for processing. The rectangular area may be a single image, a composite image or section of a larger image; where said composite image is a collection of smaller overlapping images not necessarily in the same plane may be assembled to create a reasonable equivalent image of the call number. Hereafter the image is any of the described and need not be rectangular in shape as shown in the sequences. The frequency of image collection may be based on time or movement or both, dynamic.

FIG. 3A shows the image area containing edge portions 17, 18, 24, 1, 3 and 4 and a significant portion of the identification sequence, the call number. Edges 1, 3, 4 and the image edge make a bounded area within the image. If the bounded area is sent to the OCR, a sequence would be returned. The sequence contains formatting; letter(s), number(s), period, letter(s), number(s), number(s). The sequence has incomplete consistency; last character may not be whole or no space to indicate the end of the number. The formatted but incomplete sequence suggests edge 4 is a call number label edge and asserts edges 1 and 3 are incomplete call number label edges.

Image processing establishes coordinates for edge determination, etc. The image coordinates are related to the physical coordinates. Initial candidate coordinates for establishing relative coordinates lay at the intersection of edges 18 and 24 or edges 3 and 4.

FIG. 3B shows another image containing edge portions 24, 1, 2, 3 and 4. The current image together with the previous images edge 2 is recognized and edges 1, 3 and 24 are recognized as increasing in length. Edges 1, 2, 3 and 4 make a bounded area. If the bounded area is sent to the OCR, a sequence would be returned. The sequenced is consistent by format. The sequence may be validated by comparison to a known list. The edges 1, 2, 3 and 4 are marked as label boundaries. The label dimensions have been learned for this article. Elements of the previous image are updated; edges 1, 3 and 4 are label boundaries. The image of FIG. 3A combined with the current image form a larger composite image which will allow width calculation. Edges 18 and 24 are not identified as article edges; the edges may be some other type of mark.

The candidate origin coordinate is not necessarily determined. If a local policy of using the lower left corner of the call number label, the origin may be set as such and all edge location information updated accordingly. On the other hand if the local policy is using an article corner, then the origin cannot be determined without ambiguity; operator input may be required. For the remainder of the discussion, let position information be based on label position. The list has N1 at the origin.

FIG. 3C shows another image containing edge portions 19, 24, 1, 2, 3 and 4. The current image together with the previous images edges 1, 2, 3 and 4 are recognized and edge 24 is recognized as increasing in length. Edges 18 and 24 are not identified as article edges; the edges may be some other type of mark. Similarly for edge 19.

If the call number were not on a label, no label edges, the edges 18, 19, 24 and the upper image edge would make up a bounded area when a larger composite image is used. If the bounded area is sent to the OCR, a sequence would be returned. The sequenced is consistent by format. The sequence may be validated by comparison to a known list. The edges 18, 19 and 24 are marked as boundaries. If the call number for N2 were not on a label the edge 19 would be identified as an article boundary when the method determined the sequence. An alternative location for the origin would be used.

Further discussion will continue using the call number label.

FIG. 3D shows another image containing edge portions 19, 24, 1, 2, 3, 5, 7 and 8. The current image together with the previous images edges 1, 2, 3 and 19 are recognized and edge 24 is recognized as increasing in length. Edge 8 is identified as a possible label edge due to its length. The bounded area of 5, 7, 8 and the image edge is sent to the OCR, a sequence would be returned. The sequence contains formatting; letter(s), number(s), period, letter(s), number(s), number(s). The sequence has incomplete consistency; a character is not complete. The sequence with incomplete consistency, edge 8 is a possible call number label edge and asserts edges 5 and 7 as possible call number label edges. If edges 5, 7 and 8 are designated call number label edges at this time then edge 19 may be inferred to be the right article edge for N1 and the left article edge of N2.

FIG. 3E shows another image containing edge portions 24, 5, 7 and 8. The current image together with the previous images edge 8 is recognized and edges 24, 5 and 7 are recognized as increasing in length. The bounded area of 5, 7, 8 and image edge is sent to the OCR which returns a sequence. The sequenced is consistent by format. The sequence may be validated by comparison to a known list. Edge 8 is a call number label edge and edges 5 and 7 are incomplete call number label edges. The inference that edge 19 is the right article edge for N1 and the left article edge of N2 remains.

FIG. 3F shows another image containing edge portions 24, 5, 6, 7 and 8. The current image together with the previous images edge 8 is recognized and edges 24, 5 and 7 are recognized as increasing in length. Edges 5, 6, 7 and 8 are of similar length to the learned label size of 1, 2, 3 and 4 edges for N1. The bounded area of edges 5, 6, 7 and 8 is sent to the OCR which returns a sequence. The additional computational time of the OCR is not required if the image is used to complete edges 1 and 3 and find the connecting edge 6; as well as any other edges to be address in the new portions of the image of FIG. 3F compared to the image of FIG. 3E. Edges 5, 6, 7 and 8 are marked as label boundaries. The learned label size is compared to current label size and updated as necessary. If edges 5, 6, 7 and 8 were for a label of a different size the learned edges would be used for an alternative check for edge lengths for label boundaries. The inference that edge 19 is the right article edge for N1 and the left article edge of N2 is confirmed with the presence of 2 call numbers separated by a distance. Edge 24 may be inferred to be the article bottom edge; the shelf. Edge 24 is also possible to be some other continuous line as typically seen on a set of encyclopedias. Edge 18 is similar to edge 19 so edge 18 may be inferred to be an article edge. The article N1 width may be calculated. The list has N1 at the origin and N2 at some offset from the origin.

FIG. 3G shows another image containing edge portions 20, 24, 5, 6, and 7. The current image together with the previous images edges 5, 6 and 7 are recognized and edge 24 is recognized as increasing in length. Edge 20 extends from edge 24 to the upper edge of image. A comparison of edge 20 to edge 19 infers that edge 20 is an article edge. The article N2 width may be calculated.

FIG. 3H shows another image containing edge portions 20, 21, 24, 9, 11 and 12 where edge 12 lays along edge 21. The current image together with the previous images edge 20 is recognized and 24 is recognized as increasing in length. The bounded area 9, 11, 12, where 12 is the portion of edge 21 extending from edge 9 to 11, and the image edge may be sent to the OCR which returns a sequence. The sequence has identification formatting. Edge 21 is similar to edge 18 and 19. By similarity and formatting edge 21 may be inferred to be an article edge. The width described by edges 20 and 21 is too small for a label. The position is marked for manual review.

FIG. 3I shows another image containing edge portions 21, 24, 9, 11 and 12 where edge 12 lays along edge 21. The current image together with the previous images edge 21 and 12 are recognized and 24, 9 are 11 are recognized as increasing in length. The bounded area 9, 11, 12, where 12 is the portion of edge 21 extending from edge 9 to 11 as in the image of FIG. 3H, and the image edge may be sent to the OCR which returns a sequence. The sequence contains formatting; letter(s), number(s), period, letter(s), number(s), number(s). The sequence has incomplete consistency; a character is not complete. The sequence with incomplete consistency, edge 12 is a possible call number label edge and asserts edges 9 and 11 as possible call number label edges.

FIG. 3J shows another image containing edge portions 21, 22, 24, 9, 10 and 11 where edge 12 lays along edge 21 and where edge 10 lays along edge 22. The current image together with the previous images edge 9, 11, 21 and 12 are recognized and 24 is recognized as increasing in length. The bounded area 9, 11, 12, and 10, where 10 is the portion of edge 22 extending from edge 9 is sent to the OCR which returns a sequence. The sequenced is consistent by format. The sequence may be validated by comparison to a known list. Edges 9, 10, 11 and 12 are call number label edges. Edges 21 and 22 are similar to edges 18, 19 and 20. By similarity and label boundaries edges 21 and 22 may be inferred to be an article edge. The width of N4 may be calculated. The list has N1 at the origin, N2 at some offset from the origin, some space requiring manual review and N4 at some larger offset from the origin.

FIG. 3K shows another image containing edge portions 22, 24, 9, 10 and 11 where edge 10 lays along edge 22. The current image together with the previous images edges 22, 9, 10 and 11 are recognized and 24 is recognized as increasing in length. No other information.

FIG. 3L shows another image containing edge portions 22, 24, 9, 10, 11, 13, 15 and 16 where edge 10 lays along edge 22. The current image together with the previous images edges 22, 9, 10 and 11 are recognized and 24 is recognized as increasing in length. Edge 16 has a length similar to the learned label edge length. The area bounded by 13, 15, 16 and the image edge is too small to contain useful information. Displacement of images, the relative position calculation, is maintained due to changes in previously identified edges, e.g. edges 22 and 24, and any marks if present, features.

FIG. 3M shows another image containing edge portions 24, 13, 15 and 16. The current image together with the previous images edge 16 is recognized and edges 13, 15 and 24 are recognized as increasing in length. The bounded area of 13, 15, 16 and image edge is sent to the OCR which returns a sequence. The sequenced is consistent by format. The sequence may be validated by comparison to a known list. The consistent sequence suggests edge 16 is a call number label edge and asserts edges 13 and 15 are incomplete call number label edges.

FIG. 3N shows another image containing edge portions 13, 14, 15 and 16. The current image together with the previous images edges 13, 15 and 16 are recognized and edge 24 is recognized as increasing in length. Edges 13, 14, 15 and 16 are of similar length to the previously learned label size. The bounded area of edges 13, 14, 15 and 16 is sent to the OCR which returns a sequence. The additional computational time of the OCR is not required if the image is used to complete edges 13 and 15 and find the connecting edge 14; as well as any other edges to be address in the new portions of the image of FIG. 3N compared to the image of FIG. 3M. Edges 13, 14, 15 and 16 are marked as label boundaries. The list has N1 at the origin, N2 at some offset from the origin, some space requiring manual review, N4 at some larger offset from the origin and N5 at some larger offset from the origin.

FIG. 3O shows another image containing edge portions 23, 24, 13, 14 and 15. The current image together with the previous images edge 13, 14 and 15 are recognized and 24 is recognized as increasing in length. Edge 23 is similar to edges 18, 19, 21 and 22. By similarity and label boundary edge 14 previously identified to left of edge 23, edge 23 may be inferred to be an article edge. The width of N5 may be calculated.

FIG. 3P shows another image containing edge portions 23, 24, 13, 14 and 15. The current image together with the previous images edges 13, 14, 15 and 23 are recognized and 24 is recognized as increasing in length. No other information when considered in comparison to the previous retained image of FIG. 3O. Alternatively, the image of FIG. 3O may have been discarded since the image did not move a significant distance. If the image of FIG. 3O were not used then the image processing previously described for image would apply for image of FIG. 3P regarding article N5.

FIG. 3Q shows another image containing edge portions 23 and 24. The current image together with the previous images edge 23 is recognized and 24 is recognized as increasing in length. No other information.

FIG. 3R shows another image containing edge portions 24. The current image together with the previous images edge 24 is recognized as increasing in length. No other information. If no other features are present, relative position may be lost as for an open area or end of the articles for the shelf.

As previously mentioned in the discussion of FIG. 3P, the image of FIG. 3O may not be required. A similar condition may exist for images of FIGS. 3B and 3E thereby reducing computational time.

The method in use described a left to right scan starting at N1. The scan could have started from right to left or in the middle. For a scan starting in the middle, say N2, the operator may move to left first and then to right. The data structures containing the relevant edge information and position would be updated as necessary.

The method in use for a shelf of articles description ends.

The method may read a single article where the call number is located in any location on an article using a single image where the image was acquired significantly parallel to the call number label. Consider the image area of FIG. 3F where the image is not a composite image. The image contains sufficient detail or resolution such that the call number character sequence may be determined.

All or part of an image may be processed by the OCR.

Generally, any image that includes the entire call number sequence will have as a minimum the image edges. Depending on the layout of the sequence, single or multi-line or many characters, etc, the image may be large and hence the area to be processed by the OCR is large. It is desirable to minimize the image portion to be processed by the OCR to an area that contains the call number.

Edges or boundaries surrounding the call number may be present such as a call number label or article edges or features such as logos. Frequently a label is attached to an article which contains the call number. Other markings such as publisher marks may indicate the preferred area. The article may not have a label as in hand-written cases. The article label may be long and narrow as in the case for CDROM or similar media cases.

Edges or boundaries derived from the image for identifying a preferred area are maintained. An image may contain more that one call number hence multiple areas must to be processed by the OCR.

The OCR character sequence is validated by format for the classification system in use and completeness by using preferred areas where available. The results are stored as required.

The validated call number as well as supporting image may be presented to an operator for independent verification. The results are stored as required.

The preferred area to process by the OCR for a call number is frequently bounded by label edges; the preferred area size, edges, may be learned.

The character sequence may be checked to known items such as a database of items. The database may contain a sequence that is not alpha-numeric order based. The alphanumeric sequence may be time ordered where the character sequence used has no time reference such as time when placed in inventory. For instance, consider some article A with a number 5003 and some article B with a number 625. If A arrives before B, the number references would be checked to known database and order established.

A list of articles to be found, a search list, may be established. The search list may be for lost articles, articles to be collected for checkout etc. A call number is checked against the search list and an alert is made when the item is on the search list.

The method may employ a collection of images to make a composite image such as a panoramic image may be created from many individual using known image processing techniques. The composite image contains sufficient detail such that the call number character sequence may be determined. A plurality of images, each making up an area not necessarily containing the entire call number or poor quality image areas or other may be combine to create a composite image. The poor quality image areas may be due to the curvature of the surface the label attached or the sequence is written, physical limitations of imaging equipment, etc. In this manner the composite image may use both look ahead and look behind to capture pertinent features of the articles such as spine curvature. As the camera or article move, multiple time stamped images, each with relative coordinates permits relative movement and relative speed to be calculated using the overlapping features within each image. Image acquisition rates, frames per second, are dynamically adjusted to maintain composite image quality. The plurality of images making up a composite image are time stamped such that relative position may be determined for each image or by comparing feature movement within adjacent images. Relevant data is stored for the composite image. The composite image contains sufficient detail or resolution such that the call number character sequence may be determined.

A plurality of images making up a composite image may be extended for multiple articles such that many articles may be checked in a continuous manner as for a shelf of articles.

When many articles are checked, articles may be thin requiring the label to be placed in a location not on the spine. An alert is generated such that a manual entry may be made or a individual scan.

As the list is created the list is checked for out or order character sequences indicating an article that is out of its ordered position. An alert is made.

Multiple shelves may be scanned simultaneously with each shelf having a list. Scan may be from left to right or right to left so both sides of an aisle may be scanned at the same time.

Sorting algorithms are used to identify an article or plurality of articles that must be moved to maintain proper order requiring the least number of movements. Consider articles with the fictitious labels B1, B5, B2, B3, B4, B6. In a situation where the scan is from left to right, the B2 or B5 may be considered out of order. If corrected immediately by moving B5 the sequence is B1, B2, B5, B3, B4, B6. Similar out of order alerts are found for B3 and B4 resulting in a total of 3 shelving operations. If action is deferred, B5 would be identified as the most out of order resulting in a single shelving operation. Using the same fictitious sequence and scan from right to left, a single shelving operation would be required regardless if the shelving operation were immediate or deferred.

A plurality of lists may be checked for order in that the call number order will have a maximum and minimum in general for any set of ordered articles; e.g. a shelf of books. For a list A that is before list B, a maximum article of list A will not belong to list B. If an item in list would belong to list B, let it be designated article C, C would be a maximum item in list A. Similarly the set of articles in list B that are less than the C may be moved to shelf A before article C. It is desirable to move the least number of out of sequence articles. Without loss of generality the order may be high to low or a custom sequence.

The present invention is distinguished in one aspect from the prior art of circulation control in that the prior art does not assist users to shelve articles. The user or operator of the method application will read an article to be shelved label to acquire the article's sequence. Stacks typically have a general label at each end while the individual shelves will not be labeled to contain a specific sequence range. The user or operator will periodically read a label of a shelved article for its sequence. The method application will compare the sequences including communication to a sequence database if required. The comparison results will be used to guide the user or operator to the correct location. In this manner, the inventory can be arranged or designed such that the shelving time is reduced, simplified and provides for increased operational efficiency due to the control of the item placement according to a data map wherein proper arrangement can be known and conveyed to the application interface. A notification device which can be audio and/or visual wherein audio would signal to stop movement and a laser pointer would show the position required of the book according to a data map for that particular article on the cart which needs to be placed on the shelve.

The realization of this method may take the form of a handheld device as a completely integrated unit with computer, computer readable medium encoded with computer executable instructions or encoded software, computer readable memory for storing images and lists, wired and wireless communications to other devices. Similarly, a handheld camera and portable computer performing the functions of the handheld device; many cameras and a portable computer performing the functions of the handheld device; many handheld devices and a computer coordinating actions of the handheld devices; and so forth.

The method preferred embodiment includes a learning period such that the image processing may be faster and more accurate. The learning should include the locally implemented label type details. Frequently used fonts and font size would be used to help distinguish between publisher marks and call numbers. The label dimensions and label color which assists in limiting the size of image to be processed by the optical character recognition engine. Labels may have location information, e.g. building name as when institution has multiple libraries, or organizational logos. The building name has importance for finding misplaced articles. Both the building name and logos would help identify the label location faster.

What is claimed is:

1. A method for determining a call number using a computer readable medium encoded with computer executable instructions and camera, said method comprising the steps of:
    capturing an article image where the call number is typically located where the captured article image is a single image or a plurality of images composed of a collection of smaller sufficiently overlapping images, a composite image, where the images making the composite image are not necessarily in the same plane;
    identifying areas likely to contain the call number within the said article image;
    converting the said area to characters, the character sequence;
    the said character sequence is checked for validity according to the classification system in use;
    displaying said article image and character sequence to the operator;
    storing said character sequence and image;
    a list of articles to be found, a search list, such that the call number is checked against the search list and an alert is made;
    camera movement is applied to images of adjacent or nearby articles such that a list may be created of a plurality of articles.

2. The method according to claim 1, wherein said area likely to contain the call number dimensions may be learned.

3. The method according to claim 1, wherein said character sequence is checked to a database.

4. The method according to claim 1, wherein said article dimensions are not of sufficient size to position an article's call number, an alert is made for a manual inspection.

5. The method according to claim 1, wherein said list is checked for order and alerts are made for out of order articles.

6. The method according to claim 5, where sorting algorithms are used to identify an article or plurality of articles that must be moved to maintain proper order requiring the least number of movements.

7. The method according to claim 6, where a plurality of list are cross-checked for order.

8. The method according to claim 5, where an article to be stored is scanned followed by articles already in the stored position wherein the method provides guidance to the proper stored placement.

9. The method according to claim 1, where a plurality of lists may be created simultaneously.

* * * * *